(12) United States Patent  (10) Patent No.: US 6,695,178 B2
Eppler                         (45) Date of Patent:     Feb. 24, 2004

(54) PACK WITH METERING DEVICE

(75) Inventor: Wolfgang Eppler, Heilbronn (DE)

(73) Assignee: Bestfoods, Englewood Cliffs, NJ (US)

( * ) Notice: Subject to any disclaimer, the term of this patent is extended or adjusted under 35 U.S.C. 154(b) by 2 days.

(21) Appl. No.: 10/055,119

(22) Filed: Jan. 23, 2002

(65) Prior Publication Data

US 2002/0100768 A1 Aug. 1, 2002

(30) Foreign Application Priority Data

Jan. 26, 2001 (DE) .......................................... 101 03 477

(51) Int. Cl.⁷ .............................................. G01F 11/26
(52) U.S. Cl. ...................... 222/456; 222/159; 222/454
(58) Field of Search ................. 222/159, 454, 222/456

(56) References Cited

U.S. PATENT DOCUMENTS

| | | | |
|---|---|---|---|
| 3,650,439 A | * | 3/1972 | Shimooka .................... 222/456 |
| 4,646,948 A | * | 3/1987 | Jennings ...................... 222/454 |
| 5,029,736 A | * | 7/1991 | Maruyama et al. ......... 222/456 |
| 5,873,493 A | * | 2/1999 | Robinson .................... 222/454 |
| 6,029,859 A | * | 2/2000 | Robbins, III ................ 222/454 |

FOREIGN PATENT DOCUMENTS

| | | |
|---|---|---|
| DE | 83 22 074 | 7/1984 |
| GB | 158 960 | 2/1921 |

* cited by examiner

*Primary Examiner*—Kenneth Bomberg

(57) ABSTRACT

The invention relates to a pack comprising a storage compartment (1) and a dispensing compartment (2), the dispensing compartment (2) comprising a metering space (6) and an outlet space (13), in which there is an outlet opening (4), there being between the storage compartment (1) and the dispensing compartment (2) a dividing wall (3) that, in an area (12) of the dividing wall (3) that—compared with other areas of the dividing wall (3)—is at the greatest distance from the pack base (7), is penetrated by a connecting piece (5), which projects into the dispensing compartment (2) and ends flush on the side of the storage compartment (1) and through which the contents can pass from the storage compartment (1) into the dispensing compartment (2), that end of the connecting piece (5) which faces the dispensing compartment (2) sloping in the direction of the metering space (6).

9 Claims, 5 Drawing Sheets

PACK WITH METERING DEVICE

Figure 1:
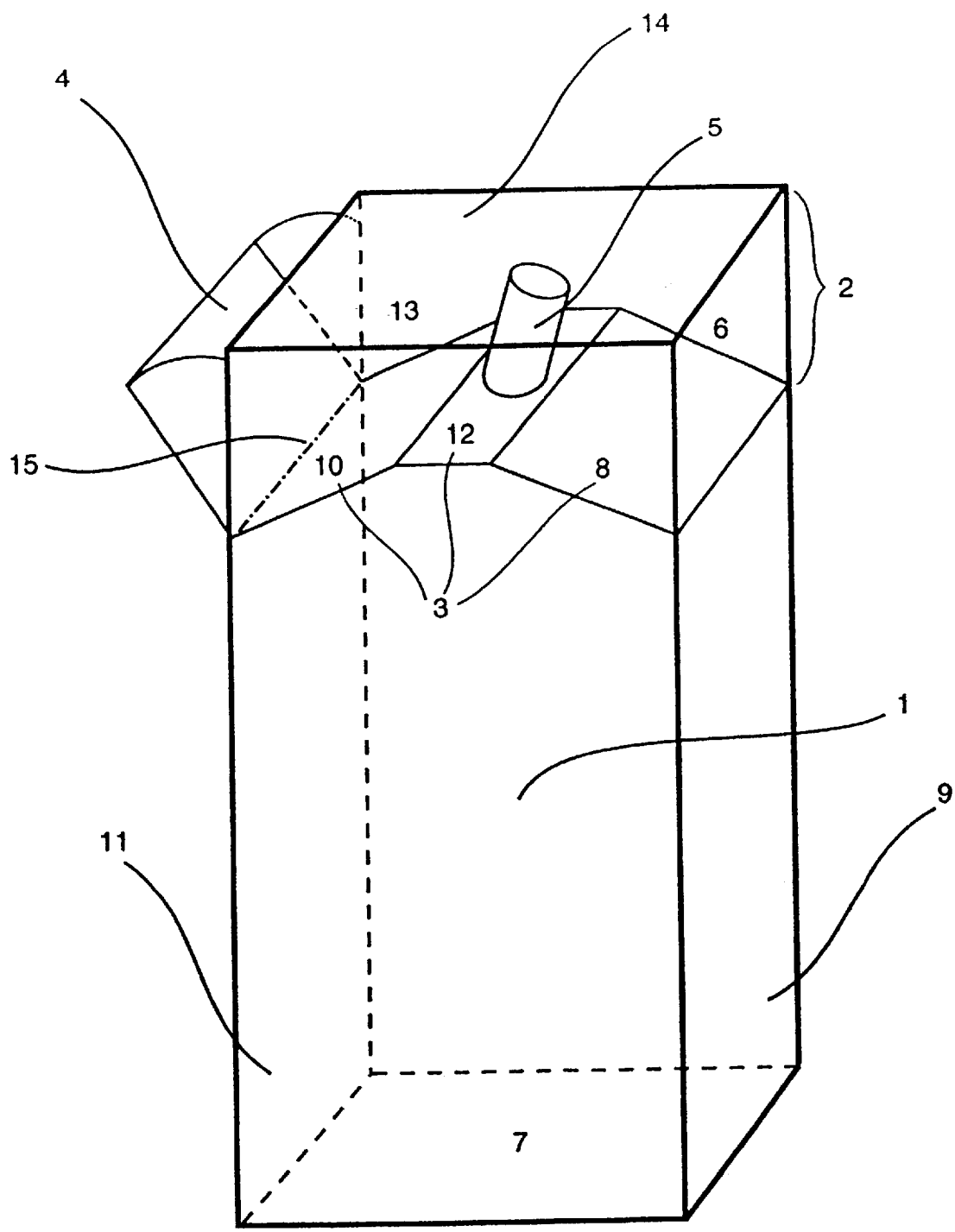

The present invention relates to a pack with a metering device, from which a particular quantity of a powdery material can be dispensed each time.

For many ingredients and additives for food, it is desirable to make them available in a pack that also allows a particular quantity of the contents to be removed without causing any problems. There should, for example, be no need to use an aid such as a spoon to remove the contents of the pack since this might contaminate the contents. Moreover, the pack should allow particular quantities of the contents to be metered and removed easily.

Swiss Patent 645858 discloses a pack for powdery material, from which predetermined portions of the material can be removed by turning the pack over. DE-A 1953792 discloses a container with a metering chamber for quantitative dispensing of powdery material. DE-A 2 356 115 also relates to a metering device for dry granular material. German Utility Model 8322074 discloses a metering device for dispensing a product capable of flow from a storage container from which defined quantities of the contents can be removed by turning the container over. British Patent 1 230 154 relates to a container for dispensing predetermined quantities of a flowable material comprising a main chamber and a metering chamber, which are connected by an opening.

It is an object of the present invention to provide a pack for powdery material capable of flow, from which defined quantities of the contents can be removed easily. Moreover, none of the quantity metered should flow back while the defined quantity of the contents is being dispensed. Finally, it should be possible to empty the pack without leaving residues behind.

The object has been achieved by means of the pack according to the invention with a metering device. The present invention relates to a pack comprising a storage compartment (1) and a dispensing compartment (2), the dispensing compartment (2) comprising a metering space (6) and an outlet space (13), in which there is an outlet opening (4), there being between the storage compartment (1) and the dispensing compartment (2) a dividing wall (3) that, in an area (12) of the dividing wall (3) that—compared with other areas of the dividing wall (3)—is at the greatest distance from the pack base (7), is penetrated by a connecting piece (5), which projects into the dispensing compartment (2) and ends flush on the side of the storage compartment (1) and through which the contents can pass from the storage compartment (1) into the dispensing compartment (2), that end of the connecting piece (5) which faces the dispensing compartment (2) sloping in the direction of the metering space (6).

Figure 2A:
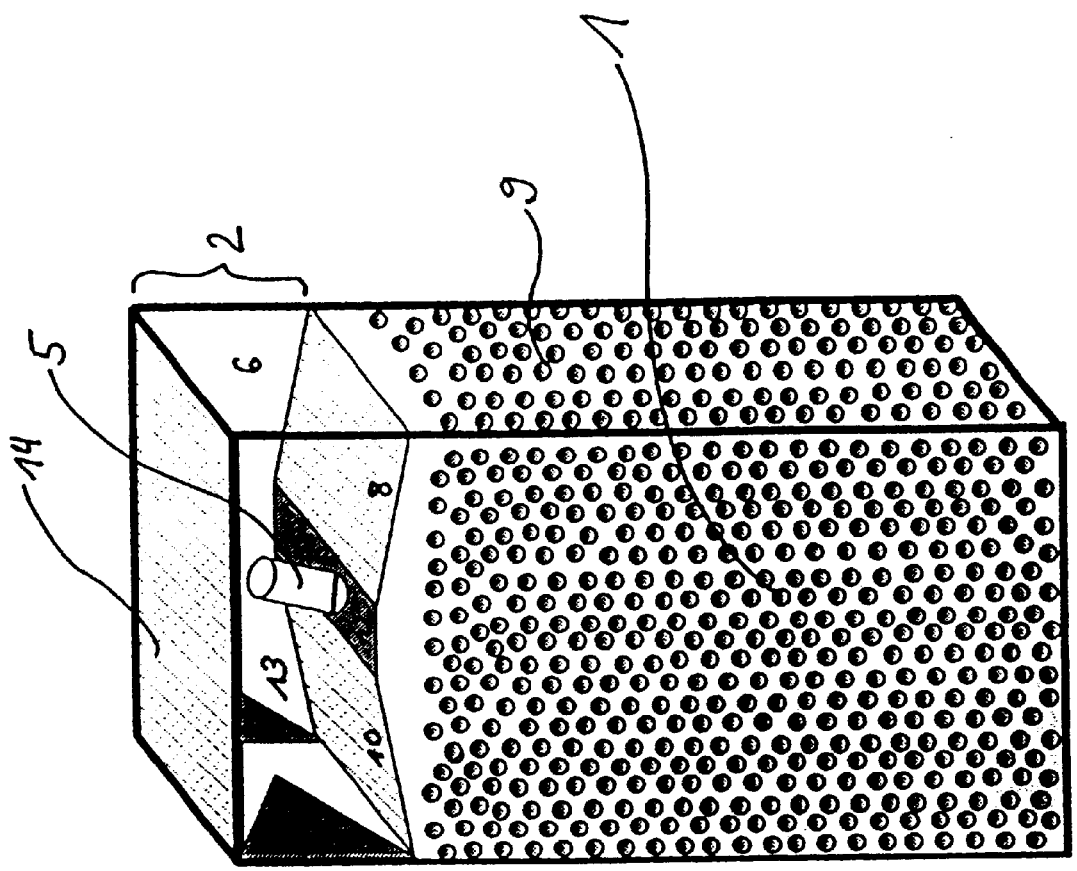
Figure 2B:
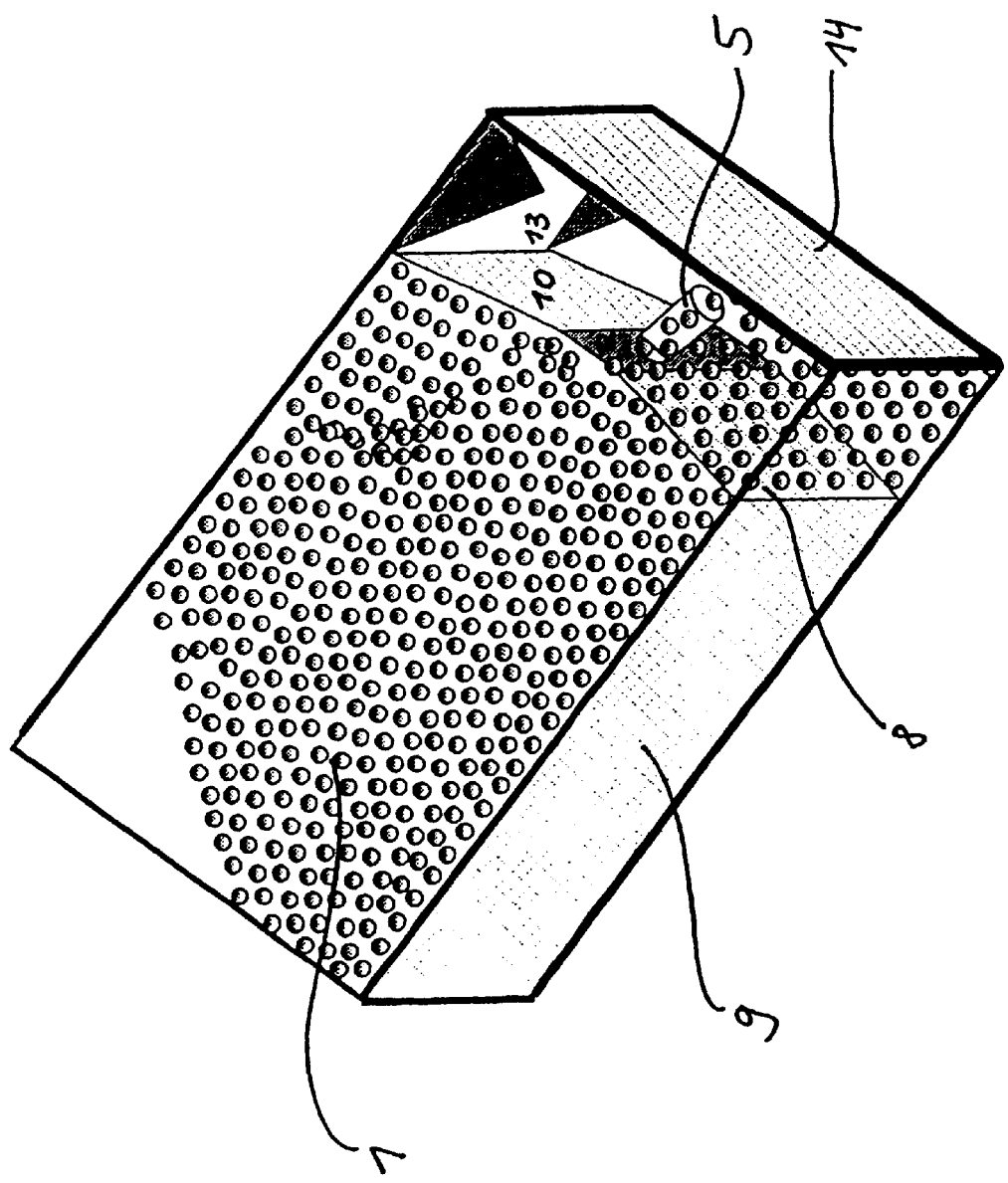
Figure 2C:
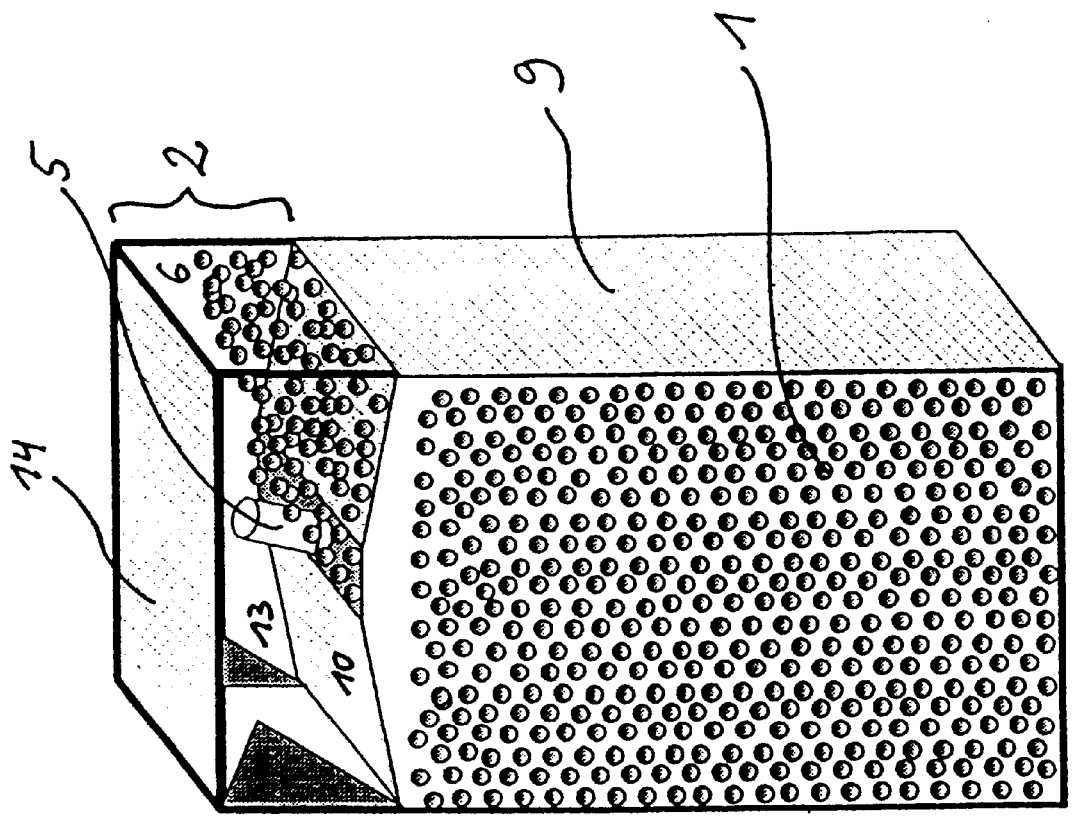
Figure 2D:
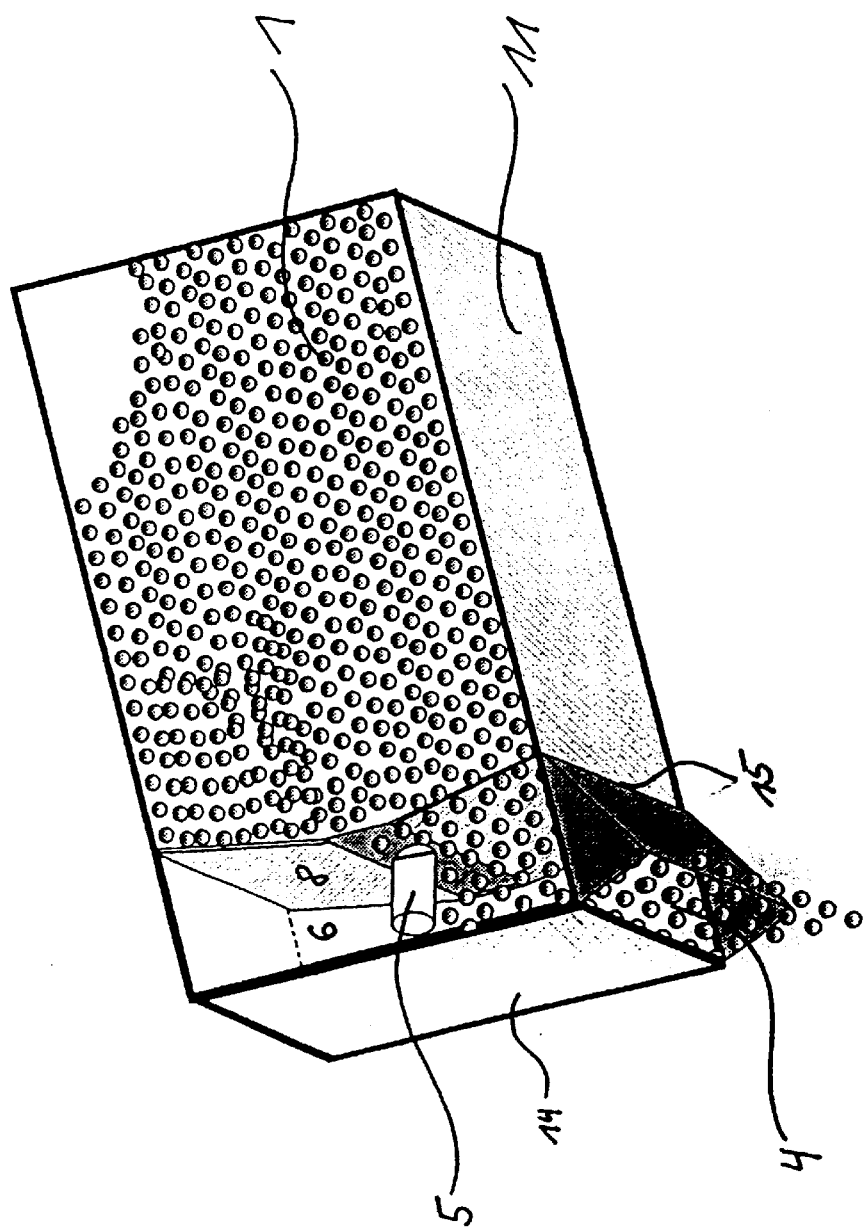

The connecting piece (5) has a shape suitable for the contents, preferably the shape of an elongate cylinder, but modified shapes are also conceivable, e.g. that of an elongate tube with an elliptical or polygonal cross section. The connecting piece (5) can also be slightly bent. The connecting piece projects into the dispensing compartment (2), with the result that it is close to the pack top (14). The longitudinal axis of the connecting piece (5) furthermore slopes slightly relative to the side walls (9) and (11). The preferred angle included by the longitudinal axis of the connecting piece (5) and the plane of the pack base (7) is 45°–85°, while the most preferred angle is 60°–80°. The slope of the longitudinal axis of the connecting piece (5) has the advantage that, when the pack is turned through 90° or more in the clockwise direction, the powdery material stored can trickle easily into the metering space (6) of the dispensing compartment (2) (FIG. 2B). This would be possible, but only in a much less effective way, if the longitudinal axis of the connecting piece were perpendicular to the plane of the pack base (7). Another advantage of the sloping connecting piece (5) is that it is not possible for any of the contents to pass from the storage compartment (1) into the dispensing compartment (2) while the metered portion is being dispensed (FIG. 2D).

The dividing wall (3) can be divided into a number of areas. A first area (8) divides the storage compartment (1) from the metering space (6) of the dispensing compartment (2). It is preferred that this area (8) should form a surface which is not parallel to the plane of the pack base (7) but slopes downwards in the direction of the pack base (7) from the connecting piece (5) towards the side wall (9). A preferred angle included by the area (8) of the dividing wall (3) and the plane of the pack base (7) is 5°–45°, with an angle of 15°–30° being even more preferable. The slope of the area (8) has the advantage that a larger quantity of material to be metered can be made available when filling the metering space (6) by tilting the pack and that the material in the metering space (6) cannot readily pass into the outlet space (13) of the dispensing compartment (2) as the pack is returned to the initial position. This allows more accurate metering.

Another area (10) of the dividing wall (3) extends essentially from the connecting piece (5) to the side wall (11) of the pack. This area (10) too is preferably not parallel to the plane of the pack base (7) but slopes downwards in the direction of the pack base (7) from the connecting piece (5) towards the side wall (11). The angle included by the area (10) and the plane of the pack base (7) is preferably 5°–45°, more preferably 15°–30°.

In another embodiment, the area (12) of the dividing wall (3), which is arranged between areas (8) and (10), is essentially parallel to the plane of the pack base (7).

It is obvious to the person skilled in the art that the dividing wall (3) does not necessarily have to consist of areas (8, 10, 12) forming discrete surfaces. On the contrary, the individual areas can merge into one another without edges or the dividing wall (3) can be in the form of an arch, the area (12) of the dividing wall (3) thus forming a ridge that merges on both sides into the areas (8) and (10). The person skilled in the art will be readily able to modify the preferred embodiment in an appropriate manner.

The pack according to the invention also comprises an outlet opening (4), through which the metered quantity of the contents can be dispensed from the pack. The outlet opening (4) is preferably in the form of a hinged closure. A flap component, which is connected to the side wall (11) by a hinge component (15), can then be opened, thereby opening the outlet opening (4) and allowing the metered contents to emerge. It is preferred that the hinge component (15) should be arranged at the point on the side wall (11) at which the area (10) of the dividing wall (3) is in contact with the side wall (11). This is an advantageous way of ensuring that the metered material can be removed completely from the dispensing compartment (2) without leaving residues when the metered quantity of the contents is removed by tilting the pack anticlockwise (FIG. 2D).

The preferred shape of the pack according to the invention is that of a parallelepiped. However, modified shapes are also conceivable. In one particular embodiment, the pack comprises inspection windows, through which it is possible to see the interior of the metering space (6) of the dispensing compartment (2). This makes it possible to monitor visually how full the metering space (6) is. The inspection windows can be formed in one, two or more walls of the pack. They are preferably formed in the front wall and the rear wall of the pack, allowing the level of material in the metering space to be monitored from the front. The inspection windows are composed of materials known per se to the person skilled in the art. Examples of such materials are silica glasses or films.

The pack itself can be composed of materials known per se. Cardboard, polypropylene or polyethylene are customary materials.

Metering and removal of a particular quantity of the contents of the pack can be accomplished as follows:

Starting from the initial position of the pack (see FIG. 2A), the pack is turned clockwise through about 90° to 150° (FIG. 2B). In the process, the powdery material it contains flows from the storage compartment (1), through the connecting piece (5) and into the metering space (6) of the dispensing compartment (2). The connecting piece (5) is designed in such a way that the quantity of the contents to be metered is transferred to the metering space (6) of the dispensing part (2). The size of the opening depends on the type of material contained in the pack. The level of material in the metering space can be monitored through the inspection window. The pack is now rotated back into the original position (FIG. 2C). If the rotation is continued by 0°–90° beyond the original position, the metered contents can be removed if the outlet opening (4) is open (FIG. 2D).

The mode of operation described makes it clear that metered quantities of the contents can be made available in a simple manner, e.g. with just one hand, by means of the pack according to the invention.

The pack according to the invention is suitable for all materials that are powdery and/or capable of flow, especially food and additives for food. Examples of suitable contents are binders, stock, soup, sauces and cereals, e.g. wheat and rice. The invention can therefore be used to particular advantage in the catering sector.

One embodiment of the invention is shown in FIG. 1. The use of such a pack is shown in FIGS. 2A–D.

What is claimed is:

1. Pack comprising a storage compartment (1) and a dispensing compartment (2), the dispensing compartment (2) comprising a metering space (6) and an outlet space (13), in which there is an outlet opening (4), there being between the storage compartment (1) and the dispensing compartment (2) a dividing wall (3) that, in an area (12) of the dividing wall (3) compared with other areas of the dividing wall (3) is at the greatest distance from pack base (7), is penetrated by a connecting piece (5), which projects into the dispensing compartment (2) and ends flush on the side of the storage compartment (1) and through which the contents can pass from the storage compartment (1) into the dispensing compartment (2), that end of the connecting piece (5) which faces the dispensing compartment (2) sloping in the direction-of the metering space (6) wherein the dividing wall (3) further comprises area (8) that divides the metering space (6) of the dispensing compartment (2) from the storage compartment (1) and slopes obliquely downwards in the direction of the pack base (7) from the connecting piece (5) towards the side wall (9), and area (10) that divides the outlet space (13) of the dispensing compartment (2) from the storage compartment (1) and slopes obliquely downwards in the direction of the pack base (7) from the connecting piece (5) towards the side wall (11).

2. Pack according to claim 1, characterized in that the connecting piece (5) essentially has the shape of an elongate tube with a round or elliptical cross section.

3. Pack according to claim 2, characterized in that the longitudinal axis of the connecting piece (5) includes an angle of 45°–85° with the plane of the pack base (7).

4. Pack according to claim 1, characterized in that it is essentially parallelepipedal.

5. Pack according to claim 4, characterized in that the area (8) of the dividing wall (3) that divides the metering space (6) of the dispensing compartment (2) from the storage compartment (1) includes an angle of 5°–45° with the plane of the pack base (7).

6. Pack according to claim 1, characterized in that at least part of one or more walls of the pack is transparent, making it possible to look into the interior of the metering space (6) of the dispensing compartment (2) from outside.

7. Pack according to claim 6, characterized in that the area (10) of the dividing wall (3) that divides the outlet space (13) of the dispensing compartment (2) from the storage compartment (1) includes an angle of 5°–45° with the plane of the pack base (7).

8. Pack according to claim 1, characterized in that the outlet opening (4) is in the form of a hinged closure.

9. Pack according to claim 1, characterized in that the area (12) of the dividing wall (3) in which the connecting piece (5) penetrates the dividing wall (3) is arranged essentially parallel to the plane of the pack base (7).

* * * * *